(12) United States Patent
Horichi et al.

(10) Patent No.: US 7,749,482 B2
(45) Date of Patent: *Jul. 6, 2010

(54) PROCESS FOR PRODUCING LITHIUM-CONTAINING COMPOSITE OXIDE FOR POSITIVE ELECTRODE FOR LITHIUM SECONDARY BATTERY

(75) Inventors: Kazushige Horichi, Chigasaki (JP); Etsuya Kawata, Chigasaki (JP)

(73) Assignee: AGC Seimi Chemical Co., Ltd., Chigasaki-shi (JP)

(*) Notice: Subject to any disclaimer, the term of this patent is extended or adjusted under 35 U.S.C. 154(b) by 210 days.

This patent is subject to a terminal disclaimer.

(21) Appl. No.: 11/774,782

(22) Filed: Jul. 9, 2007

(65) Prior Publication Data

US 2007/0254214 A1    Nov. 1, 2007

Related U.S. Application Data

(63) Continuation of application No. PCT/JP2006/319073, filed on Sep. 26, 2006.

(30) Foreign Application Priority Data

Sep. 27, 2005 (JP) .............................. 2005-280674

(51) Int. Cl.
*C01B 9/00* (2006.01)

(52) U.S. Cl. ................. 423/594.4; 423/594.6; 423/599; 423/464; 423/465; 423/179.5; 252/519.1; 252/519.12; 252/519.15

(58) Field of Classification Search .............. 423/594.4, 423/594.6, 599, 464, 465, 179.5; 252/519.1, 252/519.12, 519.15
See application file for complete search history.

(56) References Cited

U.S. PATENT DOCUMENTS

2006/0154146 A1    7/2006  Kawasato et al.

2006/0210879 A1    9/2006  Kawasato et al.
2007/0117014 A1    5/2007  Saito et al.
2007/0264573 A1*   11/2007 Yamada et al. ........... 429/231.1

FOREIGN PATENT DOCUMENTS

| JP | 3-201368    | 9/1991  |
|----|-------------|---------|
| JP | 6-243897    | 9/1994  |
| JP | 10-72219    | 3/1998  |
| JP | 10-312805   | 11/1998 |
| JP | 2000-306584 | 11/2000 |
| JP | 2002-60225  | 2/2002  |
| JP | 2002-170562 | 6/2002  |
| JP | 2002-279991 | 9/2002  |
| JP | 2003-7299   | 1/2003  |
| JP | 2004-220897 | 8/2004  |
| JP | 2005-103350 | 4/2005  |

* cited by examiner

*Primary Examiner*—Steven Bos
(74) *Attorney, Agent, or Firm*—Oblon, Spivak, McClelland, Maier & Neustadt, L.L.P.

(57) ABSTRACT

To provide a process for producing a lithium-containing composite oxide for a positive electrode for a lithium secondary battery, which is excellent in the volume capacity density, safety, charge and discharge cycle durability and low temperature characteristics.

A process for producing a lithium-containing composite oxide represented by the formula $Li_pN_xM_mO_zF_a$ (wherein N is at least one element selected from the group consisting of Co, Mn and Ni, M is at least one element selected from the group consisting of Al, alkaline earth metal elements and transition metal elements other than N, $0.9 \leq p \leq 1.2$, $0.97 \leq x < 1.00$, $0 < m \leq 0.03$, $1.9 \leq z \leq 2.2$, $x+m=1$ and $0 \leq a \leq 0.02$), which process comprises firing a mixture of a lithium source, an N element source and an M element source, and if necessary, a fluorine source, in an oxygen-containing atmosphere, characterized in that as the M element source, an aqueous solution of a ketocarboxylate compound having the M element, at least one carboxyl group and at least one carbonyl group in its molecule, is used.

18 Claims, No Drawings though the cyclic properties, the low temperature characteristics and the large current discharge properties have been improved, but, the safety, the volume capacity density and the weight capacity density, have not yet been fully satisfactory.

PROCESS FOR PRODUCING LITHIUM-CONTAINING COMPOSITE OXIDE FOR POSITIVE ELECTRODE FOR LITHIUM SECONDARY BATTERY

CROSS REFERENCE TO RELATED APPLICATION

This application is a continuation of PCT/JP06/319073, filed on Sep. 26, 2006, and claims priority to Japanese Patent Application No. 2005-280674, filed on Sep. 27, 2005.

TECHNICAL FIELD

The present invention relates to a process for producing a lithium-containing composite oxide for a positive electrode for a lithium secondary battery, which has a large volume capacity density and high safety and excellent durability for charge and discharge cycles and is excellent in the low temperature characteristics, a positive electrode for a lithium secondary battery containing the produced lithium-containing composite oxide, and a lithium secondary battery.

BACKGROUND ART

Recently, as the portability and cordless tendency of instruments have progressed, a demand for a non-aqueous electrolyte secondary battery such as a lithium secondary battery which is small in size and light in weight and has a high energy density, has been increasingly high. As a cathode active material for the non-aqueous electrolyte secondary battery, a composite oxide of lithium and a transition metal (a lithium-containing composite oxide) such as $LiCoO_2$, $LiNiO_2$, $LiNi_{0.8}Co_{0.2}O_2$, $LiMn_2O_4$ or $LiMnO_2$, has been known.

A lithium secondary battery using $LiCoO_2$ among lithium-containing composite oxides as a cathode active material and using a lithium alloy or carbon such as graphite or carbon fiber as a negative electrode, can obtain a high voltage at a level of 4V, whereby it has been widely used as a battery having a high energy density.

However, in the case of the non-aqueous type secondary battery using $LiCoO_2$ as a cathode active material, further improvement of the capacity density per unit volume of the positive electrode layer and the safety, has been desired. On the other hand, there has been a problem of deterioration of the cyclic properties such as gradual reduction of the battery discharge capacity due to repetitive charge and discharge cycles, a problem of the weight capacity density or substantial reduction of the discharge capacity at a low temperature.

In order to solve a part of these problems, it has been proposed in Patent Document 1 that the average particle size of $LiCoO_2$ as a cathode active material, be from 3 to 9 μm, the volume occupied by a group of particles having a particle size of from 3 to 15 μm, be at least 75% of the total volume, and the intensity ratio of the diffraction peaks at 2θ=about 19° and 2θ=45° as measured by means of X-ray diffraction analysis using CuKα rays as a radiation source, be of a specific value, so that it becomes a cathode active material excellent in the coating properties, the self-discharge characteristics and the cyclic properties. Further, in Patent Document 1, it has been proposed that the cathode active material is preferably one which does not substantially have such a particle size distribution that the particle size of $LiCoO_2$ is 1 μm or smaller, or 25 μm or larger. With such a cathode active material, the coating properties and the cyclic properties have been Further, in order to solve the problem related to the battery characteristics, Patent Document 2 proposes to replace 5 to 35% of Co atoms with W, Mn, Ta, Ti or Nb to improve the cyclic properties. Further, Patent Document 3 proposes to use hexagonal $LiCoO_2$ as a cathode active material to improve the cyclic properties, wherein the c axis length of the lattice constant is at most 14.051 Å, and the crystal lattice size of (110) direction of the crystal lattice is from 45 to 100 nm.

Further, Patent Document 4 discloses that a lithium composite oxide of the formula $Li_xNi_{1-m}N_mO_2$ (wherein N is at least one element selected from the group consisting of Al, alkaline earth metal elements and transition metal elements other than Ni, $0<x<1.1$, $0\leq m\leq 1$), of which the primary particles are plate-like or columnar, the ratio of (volume standard cumulative 95% size–volume standard cumulative 5% size)/(volume standard cumulative 5% size) is at most 3, and further, the average particle size is from 1 to 50 μm, has a high initial discharge capacity per weight and further is excellent in the charge and discharge cyclic durability.

Further, Patent Document 5 proposes to lithiate a cobalt compound powder in the form of secondary particles with an average particle size of 0.5 to 30 μm formed by agglomeration of primary particles of cobalt hydroxide, cobalt oxyhydroxide or cobalt oxide with an average particle size of from 0.01 to 2 μm. However, also in this case, it is not possible to obtain a cathode active material having a high volume capacity density, and further, the material is insufficient also with respect is to the cyclic properties, the safety or the large current discharge properties.

Patent Document 6 and Patent Document 7 propose a method of covering lithium cobaltate particles with a different metal element by a sol-gel process. But the covered lithium cobaltate is unsatisfactory in the battery performance i.e. the discharge capacity, the durability for charge and discharge cycles and the safety. Further, although an alkoxide as the starting material may be suitable at the laboratory level, it is too expensive to employ industrially. Further, as the alkoxide is very sensitive to water and is likely to be hydrolyzed, such a reaction apparatus that the alkoxide will not be influenced by water in the air will be required, and the cost of equipment tends to be high, thus raising the cost, and such is problematic economically.

Further, Patent Document 8 proposes to react a colloidal coating liquid obtained by adding water to $(NH_4)_2HPO_4$ and $Al(NO_3)_3 \cdot 3H_2O$, with lithium cobaltate particles. However, the covered lithium cobaltate is unsatisfactory in the battery performance i.e. the discharge capacity, the durability for charge and discharge cycles and the safety.

As described above, in the prior art, with respect to a lithium secondary battery employing a lithium composite oxide as a cathode active material, it has not yet been possible to obtain one which sufficiently satisfies all of the volume capacity density, the safety, the coating uniformity, the cyclic properties and further the low temperature characteristics.

Patent Document 1: JP-A-6-243897
Patent Document 2: JP-A-3-201368
Patent Document 3: JP-A-10-312805
Patent Document 4: JP-A-10-72219
Patent Document 5: JP-A-2002-60225
Patent Document 6: JP-A-2000-306584

Patent Document 7: JP-A-2002-279991
Patent Document 8: JP-A-2003-7299

DISCLOSURE OF THE INVENTION

Object to be Accomplished by the Invention

It is an object of the present invention to provide a process for producing a lithium-containing composite oxide for a positive electrode for a lithium secondary battery, which has a large volume capacity density and high safety, and excellent durability for charge and discharge cycles and which is further excellent in the low temperature characteristics, a positive electrode for a lithium secondary battery containing the produced lithium-containing composite oxide, and a lithium secondary battery containing the produced lithium-containing composite oxide.

Means to Accomplish the Object

In the present invention, an M element being an element to be substituted for an N element, is used in the form of an aqueous solution, whereby an N element such as cobalt in a lithium-containing composite oxide will be replaced by an M element sufficiently and uniformly. As a result, the above object can be satisfactorily accomplished, and it is further possible to obtain a lithium-containing composite oxide for a positive electrode for a lithium secondary battery which has high safety and excellent durability for charge and discharge cycles and which is further excellent in the low temperature characteristics. This is quite a contrast to a conventional method whereby good results can hardly be obtainable as shown in the Comparative Example given hereinafter.

Thus, the present invention provides the following:

(1) A process for producing a lithium-containing composite oxide represented by the formula $Li_pN_xM_mO_zF_a$ (wherein N is at least one element selected from the group consisting of Co, Mn and Ni, M is at least one element selected from the group consisting of Al, alkaline earth metal elements and transition metal elements other than N, $0.9 \leq p \leq 1.2$, $0.97 \leq x < 1.00$, $0 < m \leq 0.03$, $1.9 \leq z \leq 2.2$, $x+m=1$ and $0 \leq a \leq 0.02$), which process comprises firing a mixture of a lithium source, an N element source and an M element source, and if necessary, a fluorine is source, in an oxygen-containing atmosphere, characterized in that as the M element source, an aqueous solution of a ketocarboxylate compound having the M element, at least one carboxyl group and at least one carbonyl group in its molecule, is used.

(2) The process according to the above (1), wherein the N element source is a powder having an average particle size (D50) of from 1 to 25 μm.

(3) The process according to the above (1) or (2), wherein the ketocarboxylate is one having from 2 to 8 carbon atoms.

(4) The process according to any one of the above (1) to (3), wherein the aqueous solution of a ketocarboxylate compound is an aqueous solution having the pH adjusted to be from 2 to 12 by an addition of an alkali.

(5) The process according to the above (4), wherein the pH of the aqueous solution of a ketocarboxylate compound is from 4 to 10.

(6) The process according to the above (5), wherein the aqueous solution of a ketocarboxylate compound is an aqueous solution having the pH adjusted to be from 4 to 10 by an addition of ammonia as the alkali.

(7) The process according to any one of the above (1) to (6), wherein the N element source is at least one member selected from the group consisting of cobalt hydroxide, cobalt oxyhydroxide, tricobalt tetroxide and cobalt carbonate.

(8) The process according to any one of the above (1) to (6), wherein the N element source is at least one member selected from the group consisting of nickel-cobalt coprecipitated hydroxide, nickel-cobalt coprecipitated oxyhydroxide, nickel-cobalt coprecipitated oxide, nickel-manganese coprecipitated hydroxide, nickel-manganese coprecipitated oxyhydroxide, nickel-manganese coprecipitated oxide, nickel-cobalt-manganese coprecipitated hydroxide, nickel-cobalt-manganese coprecipitated oxyhydroxide and nickel-cobalt-manganese coprecipitated oxide.

(9) The process according to any one of the above (1) to (8), wherein the M element is at least one member selected from the group consisting of Ti, Zr, Hf, Nb, Ta, Mg, Sn, Zn, Cu and Al.

(10) The process according to any one of the above (1) to (9), wherein the aqueous solution of a ketocarboxylate compound, a powder of the N element source, and if necessary, a powder of the fluorine source, are mixed; the water content is removed from the obtained mixture; then, a powder of the lithium source and if necessary, a powder of the fluorine source are mixed thereto; and then, the mixture is fired at from 800 to 1,050° C. in an oxygen-containing atmosphere.

(11) The process according to any one of the above (1) to (9), wherein the aqueous solution of a ketocarboxylate compound, a powder of the N element source, a powder of the lithium source and if necessary, a powder of the fluorine source, are mixed; the water content is removed from the obtained mixture; and then, the mixture is fired at from 800 to 1,050° C. in an oxygen-containing atmosphere.

(12) The process according to any one of the above (1) to (9), wherein a lithium-containing composite oxide powder obtained by mixing and firing a powder of the lithium source, a powder of the N element source and if necessary, a powder of the fluorine source, is mixed with the aqueous solution of a ketocarboxylate compound; the water content is removed from the obtained mixture; and then, the mixture is fired at from 300 to 1,050° C. in an oxygen-containing atmosphere.

(13) A positive electrode for a lithium secondary battery containing a lithium-containing composite oxide produced by the process as defined in any one of the above (1) to (12).

(14) A lithium secondary battery using the positive electrode as defined in the above (13).

(15) A process for producing a mixture which contains at least an N element source and an M element source so that the N element:the M element (atomic ratio) be from 0.95:0.05 to 0.9995:0.0005 (where N is at least one element selected from the group consisting of Co, Mn and Ni, and M is at least one element selected from the group consisting of Al, alkaline earth metal elements and transition metal elements other than N), characterized in that as the M element source, an aqueous solution of a ketocarboxylate compound having the M element, at least one carboxyl group and at least one carbonyl group in its molecule, is used.

(16) The process according to the above (15), wherein the N element source is at least one member selected from the group consisting of a hydroxide, an oxyhydroxide, an oxide and a carbonate.

EFFECTS OF THE INVENTION

According to the present invention, it is possible to obtain a lithium-containing composite oxide having excellent characteristics for a positive electrode for a lithium secondary battery such that it has a large volume capacity density and high safety and excellent durability for charge and discharge cycles and the low temperature characteristics. Further, the present invention provides a process for producing a lithium-containing composite oxide having a high productivity and an excellent storage stability of an intermediate, further a positive electrode for a lithium secondary battery containing the lithium-containing composite oxide thereby produced, and a lithium secondary battery containing the lithium-containing composite oxide.

The reason as to why such excellent effects are accomplished by the present invention is not necessarily clearly understood, but is considered to be as follows. Namely, by the addition of an M element source by the conventional solid phase method, the amount of the M element source added was very small, whereby it was difficult to add it uniformly to the N element source or to the cathode material, and it was difficult to obtain the desired effect of the addition of the M element source. Whereas, according to the process of the present invention, the M element source is permitted to act in the form of an aqueous solution on the N element source or on the cathode material, whereby the M element can be dispersed uniformly even in pores in the cathode active material. Thus, it is considered that by the desired addition of the M element source, the effect to improve the battery performance can be obtained. Further, the M element source is permitted to act in the form of an aqueous solution on the N element source or on the cathode material, whereby the control of the composition or the particle size of the cathode active material is easy as compared with the conventional coprecipitation method, such being industrially superior.

BEST MODE FOR CARRYING OUT THE INVENTION

The lithium-containing composite oxide for a positive electrode for a lithium secondary battery to be obtained by the process of the present invention is represented by the formula $Li_pN_xM_mO_zF_a$. In such a formula, p, x, m, z and a are as defined above. Particularly, p, x, m, z and a are preferably $0.9 \leq p \leq 1.1$, $0.975 \leq x \leq 0.999$, $0.001 \leq m \leq 0.025$ and $1.9 \leq z \leq 2.1$, particularly preferably $0.97 \leq p \leq 1.03$, $0.975 \leq x \leq 0.998$, $0.002 \leq m \leq 0.025$, $1.95 \leq z \leq 2.05$, $x+m=1$, and $0.001 \leq a \leq 0.01$. Here, when a is larger than 0, it is a composite oxide having some of its oxygen atoms substituted by fluorine atoms. In such a case, the safety of the obtained cathode active material will be improved. In the present invention, the total number of cationic atoms is preferably equal to the total number of anionic atoms, i.e. the total of p, x and m is preferably equal to the total of z and a.

N is at least one element selected from the group consisting of Co, Mn and Ni. Particularly, it is preferably Co, Ni, Co and Ni, Mn and Ni, or "Co and Ni and Mn". Whereas, M is at least one element selected from the group consisting of Al, alkaline earth metals and transition metal elements other than N. In the present invention, such an M element may sometimes be referred to as an additive element. The above-mentioned transition metal elements represent transition metals of Groups 4, 5, 6, 7, 8, 9, 10 and 11 of the Periodic Table. Among them, M is preferably at least one element selected from the group consisting of Ti, Zr, Hf, Nb, Ta, Mg, Cu, Sn, Zn and Al. Particularly preferred is Ti, Zr, Hf, Mg or Al from the viewpoint of the capacity development properties, the safety, the cyclic durability, etc.

In the present invention, when M is Al and Mg, the Al/Mg atomic ratio is preferably from 1/5 to 5/1, more preferably 1/3 to 3/1, particularly preferably from 2/3 to 3/2, and m is preferably $0.002 \leq m \leq 0.025$, more preferably $0.005 \leq m \leq 0.025$, particularly preferably $0.01 \leq m \leq 0.02$, whereby the balance of the battery performance, i.e. the balance of the initial weight capacity density, the initial volume capacity density, the safety and the stability for charge and discharge cycles will be excellent. Further, M is Mg and M2 (M2 is at least one element selected from the group consisting of Ti, Zr, Ta, and Nb), the M2/Mg atomic ratio is preferably from 1/40 to 2/1, particularly preferably from 1/30 to 1/5, and m is preferably $0.002 \leq m \leq 0.030$, more preferably $0.005 \leq m \leq 0.030$, particularly preferably $0.010 \leq m \leq 0.020$. Still further, it is particularly preferred that M is Mg and Al, and Ti or Zr coexists, whereby the above-mentioned balance of the battery performance will be further improved. In such a case, Ti or Zr coexists preferably in an amount of from 1/2 to 1/20 mol based on the total number of mols of Mg and Al.

In the present invention, in a case where the above M element and/or F is contained, each of the M element and F is preferably present on the surface of lithium-containing composite oxide particles. By the presence of these elements on the surface, the important battery characteristics such as the safety and the cyclic charge and discharge properties can be improved by their addition in a small amount without bringing about the reduction of the battery performance. The presence of these elements on the surface can be judged by carrying out a spectroscopic analysis such as an XPS analysis with respect to the positive electrode particles.

In the present invention, it is necessary to use an aqueous solution of a ketocarboxylate compound containing the M element, at least one carboxyl group and at least one carbonyl group in its molecule. As the ketocarboxylic acid to be used here, one having from 2 to 8 carbon atoms is preferred, and glyoxylic acid, pyruvic acid, acetoacetic acid, oxobutyric acid or propionylacetic acid is more preferred. Particularly preferred is glyoxylic acid, since it is inexpensive, and the solubility of the ketocarboxylate compound in the aqueous solution can thereby be made high.

The aqueous solution of a ketocarboxylate compound is preferably an aqueous solution having the pH adjusted to be from 2 to 12 by an addition of an alkali. In a case where a ketocarboxylic acid having a high acidity is used, if the pH of the aqueous solution is less than 2, the N element source is likely to be dissolved, and it is preferred to adjust the pH to be from 2 to 12 by adding a base such as ammonia. If the pH exceeds 12, the M element source tends to be precipitated, such being undesirable.

The pH of the aqueous solution of a ketocarboxylate compound is more preferably from 4 to 10, particularly preferred is an aqueous solution of a ketocarboxylate compound having the pH adjusted to be from 4 to 10 by adding ammonia as the alkali.

The concentration of the aqueous solution of a ketocarboxylate compound to be used in the present invention is preferably high from such a viewpoint that in the subsequent step, a water content is required to be removed by drying. However, if the concentration is too high, the viscosity will be high, whereby the uniform mixing property with other element source powders for forming the cathode active material tends to deteriorate, or the solution tends to be hardly penetrated into the N element source powder. Accordingly, it is preferably from 1 to 30 wt %, particularly preferably from 4 to 20 wt %.

As the N element source to be used in the present invention, when the N element is cobalt, cobalt carbonate, cobalt hydroxide, cobalt oxyhydroxide or cobalt oxide may, for example, be preferably employed. Particularly preferred is cobalt hydroxide or cobalt oxyhydroxide, whereby the performance can easily be obtained. Further, when the N element is nickel, nickel hydroxide, nickel oxyhydroxide or nickel oxide may, for example, be preferably employed. Further, when the N element is manganese, manganese dioxide or manganese carbonate may, for example, be preferably employed.

Further, as the N element source, when the N element is nickel and cobalt, nickel-cobalt coprecipitated hydroxide, nickel-cobalt coprecipitated oxyhydroxide or nickel-cobalt coprecipitated oxide is preferred; when the N element is nickel and manganese, nickel-manganese coprecipitated hydroxide, nickel-manganese coprecipitated oxyhydroxide or nickel-manganese coprecipitated oxide is preferred; and when the N element is "nickel and cobalt and manganese, nickel-cobalt-manganese coprecipitated hydroxide, nickel-cobalt-manganese coprecipitated oxyhydroxide or nickel-cobalt-manganese coprecipitated oxide is preferred. More specifically, when the N element is nickel and cobalt, $Ni_{0.8}Co_{0.2}OOH$ or $Ni_{0.8}Co_{0.2}(OH)_2$, may, for example, be preferred; when it is nickel and manganese, $Ni_{0.5}Mn_{0.5}OOH$ may, for example, be preferred; and when it is nickel and cobalt and manganese, $Ni_{0.4}Co_{0.2}Mn_{0.4}OOH$ or $Ni_{1/3}Co_{1/3}Mn_{1/3}OOH$ may, for example, be preferred, as the N element source.

Further, it is particularly preferred that the N element source is a hydroxide, whereby the press density will be high, and the volume capacity density will be more improved.

As the N element source, a powder having an average particle size (D50) of from 1 to 25 µm is used. The average particle size (D50) means a particle size corresponding to the volume basis cumulative 50% size. If the average particle size is less than 1 µm, the packing properties of the positive electrode powder tend to decrease, such being undesirable. On the other hand, if the average particle size exceeds 25 µm, a uniform coated electrode surface tends to be hardly obtainable, or the large current discharge properties tend to decrease, such being undesirable. The average particle size is preferably from 4 to 20 µm. Here, in the case of agglomerated particles, the average particle size means an average particle size of the secondary agglomerated particles. In the present invention, an N element source compound in the form of secondary particles formed by agglomeration of primary particles is suitably used.

As the lithium source to be used in the present invention, lithium carbonate or lithium hydroxide is preferably used. Particularly preferred is lithium carbonate, which is inexpensive. The lithium source is preferably a powder having an average particle size (D50) of from 2 to 25 µm, more preferably from 10 to 20 µm. As the fluorine source, a metal fluoride such as LiF or $MgF_2$ may, for example, be selected for use.

The following (A), (B) and (C) may be mentioned as preferred embodiments of the process for producing a lithium-containing composite oxide, wherein as a feature of the present invention, an aqueous solution of a ketocarboxylate compound containing an M element, at least one carboxyl group and at least one carbonyl group in its molecule, is used.

(A) The aqueous solution of a ketocarboxylate compound, a powder of the N element source, and if necessary, a powder of the fluorine source, are mixed; the water content is removed from the obtained mixture; then, a powder of the lithium source and if necessary, a powder of the fluorine source are mixed thereto; and then, the mixture is fired at from 800 to 1,050° C. in an oxygen-containing atmosphere.

(B) The aqueous solution of a ketocarboxylate compound, a powder of the N element source, a powder of the lithium source and if necessary, a powder of the fluorine source, are mixed; the water content is removed from the obtained mixture; and then, the mixture is fired at from 800 to 1,050° C. in an oxygen-containing atmosphere.

(C) A lithium-containing composite oxide powder obtained by mixing and firing a powder of the lithium source, a powder of the N element source and if necessary, a powder of the fluorine source, is mixed with the aqueous solution of a ketocarboxylate compound; the water content is removed from the obtained mixture; and then, the mixture is fired at from 300 to 1,050° C. in an oxygen-containing atmosphere.

In each of the above (A), (B) and (C), a mixture containing at least an N element source and an M element source is preliminarily prepared by using as the M element source an aqueous solution of a ketocarboxylate compound having the M element, at least one carboxyl group and at least one carbonyl group in its molecule, and each embodiment can be carried out by using such a mixture. In such a case, the mixture containing at least an N element source and an M element source is preferably a mixture wherein the N element:the M element (atomic ratio) is preferably from 0.95: 0.05 to 0.9995:0.0005, more preferably from 0.97:0.03 to 0.999:0.001, further preferably from 0.975:0.025 to 0.999: 0.001, particularly preferably from 0.975:0.025 to 0.998:0.002.

Further, the N element source contained in the above mixture is preferably at least one member selected from the group consisting of a hydroxide, an oxyhydroxide, an oxide and a carbonate, more preferably a hydroxide or an oxyhydroxide, particularly preferably a hydroxide. In such a case, a granulated product thereof can be produced at a low cost, and when it is used as a raw material powder for the cathode active material, the desired characteristics may easily be obtainable.

Such a granulated product can be suitably used as an intermediate material for a lithium-containing composite oxide as defined in the above (1) to (12) according to the present invention, particularly as an intermediate material for a lithium-containing composite oxide for a positive electrode for a lithium secondary battery.

In the present invention, when the aqueous solution of a ketocarboxylate compound is permitted to act on the N element source powder, such an operation is carried out preferably under heating. Heating is more preferably from 40 to 80° C., particularly preferably from 50 to 70° C. By the heating, melting of the N element source powder is facilitated, and the N element source and the M element source can be melted constantly in a short time.

In such a method as the above (A), (B) or (C), the M element source is used in the form of an aqueous solution containing an M element salt compound of a ketocarboxylic acid. On the other hand, in a case where as an additive element, the M element source is used in the form of a powder, the average particle size of such a powder is not particularly limited, but preferably, from 0.1 to 25 µm, particularly preferably from 0.5 to 20 µm, is selected for use. Further, the amount of the M element source to be used is adjusted to achieve the desired ratio of the respective elements within a range of the above $Li_pN_xM_mO_zF_a$ as the formula of the cathode active material to be produced in the present invention.

As a method of impregnating the N element source powder with the aqueous solution of a ketocarboxylate compound in the above means (A), (B) and (C), it is possible to spray the aqueous solution of the ketocarboxylate compound over the N element source powder. However, it is preferred to put the N element source powder in the aqueous solution, followed by stirring for impregnation, and it is more preferred to sufficiently uniformly mix them so as to form a slurry by using e.g. a twin screw kneader, an axial mixer, a paddle mixer or a turbulizer. The solid content concentration in the slurry is preferably high so long as uniform mixing is achieved, but usually the solid/liquid ratio is suitably from 30/70 to 90/10, particularly preferably from 50/50 to 80/20. Further, it is preferred to carry out vacuum treatment in the above slurry state so that the solution will more readily penetrate into the N element source powder.

Removal of the water content contained in the mixture of the above (A) comprising the aqueous solution of a ketocarboxylate compound, the N element source powder and if necessary, the fluorine source powder, the mixture of the above (B) comprising the aqueous solution of a ketocarboxylate compound, the N element source powder, the lithium source powder and if necessary, the fluorine source powder, or the mixture of the above (C) comprising the aqueous solution of a ketocarboxylate compound, and a powder obtained by mixing and firing the N element source powder, the lithium source powder and if necessary, the fluorine source powder, is carried out by drying at preferably from 50 to 200° C., particularly preferably from 80 to 120° C., usually from 1 to 10 hours. The water content in the mixture is not necessarily completely removed in this stage, since it will be removed in the subsequent firing step, but it is preferably removed as far as possible, since a large quantity of energy will be required to evaporate the water content in the firing step. As an industrial means to remove the water content, a spray dryer, a flash dryer, a belt dryer, a paddle dryer or a twin screw dryer may, for example, be mentioned, and among them, a twin screw dryer is particularly preferred. The twin screw dryer may, for example, be a thermoprocessor or a paddle dryer.

In the above means (A) and (B), firing after removal of the water content from the mixture is carried out preferably at from 800 to 1,050° C. in an oxygen-containing atmosphere. If the firing temperature is lower than 800° C., formation of the lithium composite oxide tends to be incomplete. On the other hand, if it exceeds 1,050° C., the durability for charge and discharge cycles and the initial capacity tend to be low. The firing temperature is particularly preferably from 900 to 1,000° C. In the means (C), the firing temperature is preferably from 300 to 1,050° C. If it is lower than 300° C., decomposition of an organic substance tends to be inadequate, and if it exceeds 1,050° C., the durability for charge and discharge cycles or the initial capacity tends to be low. The firing temperature is particularly preferably from 400 to 900° C.

With respect to the lithium-containing composite oxide thus produced, the average particle size D50 is preferably from 5 to 30 µm, particularly preferably from 8 to 25 µm. The specific surface area is preferably from 0.1 to 0.7 m²/g, particularly preferably from 0.15 to 0.5 m²/g. Further, the half value width of the diffraction peak of (110) plane at $2\theta=66.5\pm1°$ as measured by means of X-ray diffraction analysis in which CuKα rays is used as a radiation source, is preferably from 0.08 to 0.14°, particularly preferably from 0.08 to 0.13°. Further, when the N element is cobalt, the press density is preferably from 3.65 to 4.10 g/cm³, particularly preferably from 3.70 to 4.00 g/cm³. The present invention has a characteristic such that as compared with the prior art, a high press density can be obtained. In the present invention, the press density means an apparent density of a lithium composite oxide powder when the powder is pressed under a pressure of 2 ton/cm². Further, the press density is a numerical value which is interrelated to the volume capacity density. The higher the press density, the higher the volume capacity density tends to be. Further, the lithium-containing composite oxide to be obtained by the process of the present invention is preferably such that the amount of the remaining alkali contained is preferably at most 0.03 wt %, particularly preferably at most 0.02 wt %.

In a case where a positive electrode for a lithium secondary battery is to be produced from such a lithium-containing composite oxide, the powder of the lithium-containing composite oxide is mixed with a binder material and a carbon type electroconductive material such as acetylene black, graphite or Ketjenblack. As the above binder material, polyvinylidene fluoride, polytetrafluoroethylene, polyamide, carboxymethyl cellulose or an acrylic resin may, for example, be preferably employed. The powder of the lithium-containing composite oxide obtained by the process of the present invention, the electroconductive material and the binder material will be formed into a slurry or a kneaded product by using a solvent or a dispersion medium. Such a slurry or a kneaded product is supported on a positive electrode current collector such as an aluminum foil or a stainless steel foil by e.g. coating to form a positive electrode for a lithium secondary battery.

In a lithium secondary battery using as the cathode active material a lithium-containing composite oxide obtained by the process of the present invention, a film of a porous polyethylene or a porous polypropylene may, for example, be used as a separator. Further, as the solvent for the electrolytic solution of a battery, various solvents may be used. However, a carbonate ester is preferred. As the carbonate ester, each of a cyclic type and a chain type can be used. As the cyclic carbonate ester, propylene carbonate or ethylene carbonate (EC) may, for example, be mentioned. As the chain carbonate ester, dimethyl carbonate, diethyl carbonate (DEC), ethyl methyl carbonate (EMC), methyl propyl carbonate or methyl isopropyl carbonate may, for example, be mentioned.

In the present invention, as the solvent for the electrolytic solution, the above carbonate ester may be used alone or two or more of them may be used as mixed. Further, it may be used as mixed with another solvent. Further, depending upon the material of the anode active material, there may be a case where the discharge properties, the cyclic durability or the charge and discharge efficiency can be improved by a combined use of a chain carbonate ester and a cyclic carbonate ester.

In the lithium secondary battery using as the cathode active material a lithium-containing composite oxide obtainable by the process of the present invention, a gel polymer electrolyte containing a vinylidene fluoride-hexafluoropropylene copolymer (for example, KYNAR manufactured by ELF Atochem) or a vinylidene fluoride-perfluoropropyl vinyl ether copolymer may be employed. As the solute to be added to the electrolytic solvent or the polymer electrolyte, at least one member of lithium salts is preferably used, wherein e.g. $ClO_4^-$, $CF_3SO_3^-$, $BF_4^-$, $PF_6^-$, $AsF_6^-$, $SbF_6^-$, $CF_3CO_2^-$ or $(CF_3SO_2)_2N^-$ is anion. The lithium salt as the solute is preferably added at a concentration of from 0.2 to 2.0 mol/l (liter) to the electrolytic solvent or the polymer electrolyte. If the concentration departs from this range, ionic conductivity will decrease, and the electrical conductivity of the electrolyte will decrease. More preferably, it is from 0.5 to 1.5 mol/l.

In the lithium battery using the lithium-containing composite oxide obtainable by the process of the present invention as the cathode active material, as the anode active material, a material which can occlude and discharge lithium ions may be used. The material forming the anode active material is not particularly limited, however, lithium metal, a lithium alloy, a carbon material, an oxide comprising, as a main component, a metal of Group 14 or Group 15 of the Periodic Table, a carbon compound, a silicon carbide compound, a silicon oxide compound, titanium sulfide or a boron carbide compound may, for example, be mentioned. As the carbon material, one having an organic material thermally decomposed under various thermal decomposition conditions, artificial graphite, natural graphite, soil graphite, exfoliated graphite or flake graphite may, for example, be used. Further, as the oxide, a compound comprising tin oxide as a main component can be used. As the anode current collector, a copper foil or a nickel foil may, for example, be used. The negative electrode is produced preferably by kneading the anode active material with an organic solvent to form a slurry, which is coated on the metal foil current collector, dried and pressed.

The shape of the lithium battery using the lithium-containing composite oxide obtainable by the process of the present invention as the cathode active material is not particularly limited. A sheet, film, folding, winding type cylinder with bottom or button shape may, for example, be selected for use depending upon the particular purpose.

EXAMPLES

Now, the present invention will be described in further detail with reference to Examples. However, the present invention is by no means restricted to such specific Examples.

In the following description, the representation by percentage (%) is by weight % unless otherwise specified.

Example 1

A mixed solution of a cobalt sulfate aqueous solution with ammonium hydroxide and a caustic soda aqueous solution were continuously mixed, to prepare a cobalt hydroxide slurry. The slurry was agglomerated, followed by steps of filtration and drying to obtain a cobalt hydroxide powder. As measured by means of powder X-ray diffraction analysis using CuKα rays, the half value width of the diffraction peak of (001) plane at $2\theta=19\pm1°$ of the obtained cobalt hydroxide, was 0.24°, and the half value width of the diffraction peak of (101) plane at $2\theta=38°\pm1$ was 0.23°. As a result of observation by scanning electron microscope, the particles were found to be ones having fine particles agglomerated to form substantially spherical secondary particles. As a result of particle size distribution analysis on the volume basis calculated from image analysis of observation by scanning electron microscope, the average particle size D50 was 15.4 μm, D10 was 12.2 μm and D90 was 19.9 μm. The cobalt content of the cobalt hydroxide was 62.5%.

On the other hand, 0.87 g of a commercially available magnesium carbonate powder and 1.41 g of aluminum lactate were added to 2.73 g of titanium lactate. Then, 2.60 g of a 50% glyoxylic acid aqueous solution and 191.6 g of water were added, and 0.57 g of ammonia was further added to obtain an aqueous solution with pH 7.1 wherein glyoxylates of magnesium, aluminum and titanium were uniformly dissolved. Such an aqueous solution was added to 215.43 g of the above cobalt hydroxide to obtain a slurry. The solid content concentration in the slurry was 60 wt %.

This slurry was dehydrated by a dryer at 120° C. for 2 hours and then dry-mixed with 85.23 g of lithium carbonate having a specific surface area of 1.2 m²/g. This mixture was fired in air at 950° C. for 12 hours to obtain $LiCo_{0.99}Al_{0.004}Mg_{0.004}Ti_{0.002}O_2$. The fired product was crushed, and the particle size distribution of a lithium-containing composite oxide powder formed by agglomeration of primary particles, thus obtained, was measured in a water solvent by using a laser scattering type particle size distribution measuring apparatus (Microtrac, manufactured by NIKKISO CO., LTD.). As a result, the average particle size D50 was 12.6 μm, D10 was 8.3 μm, and D90 was 18.2 μm, and the particles were substantially spherical with a specific surface area of 0.40 m²/g as obtained by means of BET method.

With respect to the lithium-containing composite oxide powder, an X-ray diffraction spectrum was obtained by using an X-ray diffraction apparatus (RINT 2100 model, manufactured by Rigaku Corporation). In the powder X-ray diffraction analysis using CuKα rays, the half value width of the diffraction peak of (110) plane at $2\theta=66.5\pm1°$ was 0.128°. The press density of this powder was 3.82 g/cm³. 10 g of this lithium-cobalt composite oxide powder was dispersed in 100 g of pure water, and after filtration, the amount of the remaining alkali was obtained by potentiometric titration with 0.1 N HCl and found to be 0.01 wt %.

The above lithium-containing composite oxide powder, acetylene black and a polyvinylidene fluoride powder were mixed in a weight ratio of 90/5/5, and N-methylpyrrolidone was added to form a slurry, which was applied on one side of an aluminum foil with a thickness of 20 μm by a doctor blade. After drying, roll pressing was carried out five times to obtain a positive electrode sheet for a lithium battery. Then, using one punched out from the positive electrode sheet as a positive electrode, using a metal lithium foil having a thickness of 500 μm as a negative electrode, using a nickel foil of 20 μm as a negative electrode current collector, using a porous polypropylene having a thickness of 25 μm as a separator and using a $LiPF_6$/EC+DEC(1:1) solution (it means a mixed solution of EC and DEC in a weight ratio (1:1) of which the solute is $LiPF_6$, the same applies to solvents as mentioned hereinafter) at a concentration of 1M as an electrolytic solution, a pair of simplified sealed cell type lithium batteries made of stainless steel were assembled in an argon grove box.

One battery out of the above two was charged up to 4.3 V at a load current of 75 mA per 1 g of the cathode active material at 25° C., and discharged down to 2.5 V at a load current of 75 mA per 1 g of the cathode active material, whereby the initial discharge capacity was obtained. Further, the density of the electrode layer was obtained. Further, with this battery, the charge and discharge cyclic test was sequentially carried out 30 times. As a result, the initial weight capacity density of the positive electrode layer at from 2.5 to 4.3 V at 25° C. was 160 mAh/g, and the capacity retention after 30 times of charge and discharge cycle was 99.2%.

Further, the other battery was charged for 10 hours at 4.3 V, and then disassembled in the argon grove box. The positive electrode body sheet was picked up after charge, and after the positive electrode body sheet was washed, it was punched out at a diameter of 3 mm, and is then sealed in an aluminum capsule with EC. And then, it was heated at a rate of 5° C./min by using a scanning differential calorimeter (EXSTAR 6000, manufactured by Seiko Instruments, Inc.), whereby the heat generation starting temperature was measured. As a result, the first peak temperature (the heat generation peak temperature) of the heat generation curve of the 4.3 V charged product was 187° C.

Example 2

In the same manner as in Example 1, 0.87 g of a magnesium carbonate powder and 1.41 g of aluminum lactate were added to 2.73 g of titanium lactate, then 3.64 g of pyruvic acid and 190.6 g of water were added, and further 0.82 g of ammonia was added to obtain an aqueous solution with pH 7.0 wherein pyruvates of magnesium, aluminum and titanium were uniformly dissolved. Such an aqueous solution was added to 215.43 g of the cobalt hydroxide obtained in Example 1 to obtain a slurry. The solid content concentration in the slurry was 60 wt %.

This slurry was dehydrated in a dryer at 120° C. for 2 hours and then dry-mixed with 85.23 g of lithium carbonate having a specific surface area of 1.2 m$^2$/g. This mixture is fired in air at 950° C. for 12 hours to obtain $LiCo_{0.99}Al_{0.004}Mg_{0.004}Ti_{0.002}O_2$. The fired product was crushed, and the particle size distribution of a lithium-containing composite oxide powder formed by agglomeration of primary particles thus obtained was measured in a water solvent by using a laser scattering type particle size distribution measuring apparatus. As a result, the average particle size D50 was 12.4 μm, D10 was 8.2 μm and D90 was 18.5 μm, and the particles were substantially spherical with a specific surface area of 0.38 m$^2$/g as obtained by means of BET method.

In the powder X-ray diffraction analysis of this powder, the half value width of the diffraction peak of (110) plane at $2\theta=66.5\pm1°$ was 0.127°. The press density of this powder was 3.80 g/cm$^3$, and the amount of the remaining alkali was 0.01 wt %.

Further, with respect to this powder, the characteristics obtained in the same manner as in Example 1 were as follows. The initial weight capacity density of the positive electrode layer at from 2.5 to 4.3 V at 25° C. was 159 mAh/g, and the capacity retention after 30 times of charge and discharge cycle was 98.9%. Further, the heat generation peak temperature of the 4.3 V charged product was 188° C.

Example 3

215.43 g of cobalt hydroxide and 85.23 g of lithium carbonate were mixed. On the other hand, 0.87 g of a commercially available magnesium carbonate powder was mixed with 1.41 g of aluminum lactate and 2.73 g of titanium lactate, then 2.60 g of a 50% glyoxylic acid aqueous solution and 191.6 g of water were added, and then 0.57 g of ammonia was added to obtain an aqueous solution with pH 7.1 wherein glyoxylates of magnesium, aluminum and titanium were uniformly dissolved. The above aqueous solution was added to the above mixture of cobalt hydroxide and lithium carbonate to obtain a slurry.

This slurry was dehydrated in a dryer at 120° C. for 2 hours to obtain a dried powder mixture. This mixture was fired in air at 950° C. for 12 hours to obtain $LiCo_{0.99}Al_{0.004}Mg_{0.004}Ti_{0.002}O_2$. The fired product was crushed, and the particle size distribution of a lithium-containing composite oxide powder formed by agglomeration of primary particles thus obtained was measured in a water solvent by using a laser scattering type particle size distribution measuring apparatus, and as a result, the average particle size D50 was 12.5 μm, D10 was 8.3 μm and D90 was 18.4 μm, and the particles were substantially spherical with a specific surface area of 0.39 M$^2$/g as obtained by means of BET method.

With respect to this lithium-containing composite oxide powder, an X-ray diffraction spectrum was obtained by using an X-ray diffraction apparatus (RINT 2100 model, manufactured by Rigaku Corporation). In the powder X-ray diffraction analysis using CuKα rays, the half value width of the diffraction peak of (110) plane at $2\theta=66.5\pm1°$ was 0.130°. The press density of this powder was 3.80 g/cm$^3$. 10 g of this lithium-cobalt composite oxide powder was dispersed in 100 g of pure water, and after filtration, the amount of the remaining alkali was obtained by potentiometric titration with 0.1 N HCl and found to be 0.01 wt %.

Further, with respect to the above lithium-containing composite oxide powder, in the same manner as in Example 1, a positive electrode sheet was prepared, a battery was assembled, and various battery characteristics were measured. As a result, the initial weight capacity density of the positive electrode layer at from 2.5 to 4.3 V at 25° C. was 159 mAh/g, and the capacity retention after 30 times of charge and discharge cycle was 99.0%. Further, the first peak temperature (the heat generation peak temperature) of the heat generation curve of the 4.3 V charged product was 185° C.

Example 4

215.43 g of cobalt hydroxide and 85.23 g of lithium carbonate were mixed. This mixture was fired in air at 950° C. for 12 hours to obtain 223.5 g of $LiCoO_2$. On the other hand, 0.87 g of a commercially available magnesium carbonate powder was mixed with 1.41 g of aluminum lactate and 2.73 g of titanium lactate, then 2.60 g of a 50% glyoxylic acid aqueous solution and 191.6 g of water were added, and then 0.57 g of ammonia was added to obtain an aqueous solution with pH 7.1 wherein glyoxylates of magnesium, aluminum and titanium were uniformly dissolved. The above aqueous solution was added to the above $LiCoO_2$ to obtain a slurry.

This slurry was dehydrated in a dryer at 120° C. for 2 hours to obtain a dried powder mixture. This mixture was fired in air at 900° C. for 12 hours to obtain $LiCo_{0.99}Al_{0.004}Mg_{0.004}Ti_{0.002}O_2$. The fired product was crushed, and the particle size distribution of a lithium-containing composite oxide powder formed by agglomeration of primary particles was measured in a water solvent by using a laser scattering type particle size distribution measuring apparatus, and as a result, the average particle size D50 was 12.2 μm, D10 was 8.0 μm and D90 was 17.9 μm, and the particles were substantially spherical with a specific surface area of 0.42 m$^2$/g as obtained by means of BET method.

With respect to this lithium-containing composite oxide powder, an X-ray diffraction spectrum was obtained by using an X-ray diffraction apparatus (RINT 2100 model, manufactured by Rigaku Corporation). In the powder X-ray diffraction analysis using CuKα rays, the half value width of the diffraction peak of (110) plane at $2\theta=66.5\pm1°$ was 0.128°. The press density of this powder was 3.79 g/cm$^3$. 10 g of this lithium-cobalt composite oxide powder was dispersed in 100 g of pure water, and after filtration, the amount of the remaining alkali was obtained by potentiometric titration with 0.1 N HCl and found to be 0.01 wt %.

Further, with respect to the above lithium-containing composite oxide powder, in the same manner as in Example 1, a positive electrode sheet was prepared, a battery was assembled, and various battery characteristics were measured. As a result, the initial weight capacity density of the positive electrode layer at from 2.5 to 4.3 V at 25° C. was 161 mAh/g, and the capacity retention after 30 times of charge and discharge cycle was 99.1%. Further, the first peak temperature (the heat generation peak temperature) of the heat generation curve of the 4.3 V charged product was 186° C.

Example 5

On the other hand, 0.87 g of a commercially available magnesium carbonate powder was mixed with 1.41 g of aluminum lactate and 2.73 g of titanium lactate, then 2.60 g of a 50% glyoxylic acid aqueous solution and 191.6 g of water were added, and 0.57 g of ammonia was added to obtain an aqueous solution with pH 7.1 wherein glyoxylates of magnesium, aluminum and titanium were uniformly dissolved. The above aqueous solution was added to 216.31 g of the above cobalt hydroxide to obtain a slurry. The solid content concentration in the slurry was 60 wt %.

This slurry was dehydrated in a dryer at 120° C. for 2 hours, and then 85.71 g of lithium carbonate having a specific surface area of 1.2 $m^2/g$ and 0.23 g of lithium fluoride were dry-mixed. This mixture was fired in air at 950° C. for 12 hours to obtain $LiCo_{0.99}Al_{0.004}Mg_{0.004}Ti_{0.002}O_{1.999}F_{0.001}$. The fired product was crushed, and the particle size distribution of a lithium-containing composite oxide powder formed by agglomeration of primary particles was measured in a water solvent by using a laser scattering type particle size distribution measuring apparatus, and as a result, the average particle size D50 was 12.0 μm, D10 was 8.5 μm and D90 was 18.6 μm, and the particles were substantially spherical with a specific surface area of 0.34 $m^2/g$ as obtained by means of BET method.

With respect to this lithium-containing composite oxide powder, an X-ray diffraction spectrum was obtained by using an X-ray diffraction apparatus (RINT 2100 model, manufactured by Rigaku Corporation). In the powder X-ray diffraction analysis using CuKα rays, the half value width of the diffraction peak of (110) plane at 2θ=66.5±1° was 0.120°. The press density of this powder was 3.80 $g/cm^3$. 10 g of this lithium-cobalt composite oxide powder was dispersed in 100 g of pure water, and after filtration, the amount of the remaining alkali was obtained by potentiometric titration with 0.1 N HCl and found to be 0.01 wt %.

Further, with respect to the above lithium-containing composite oxide powder, in the same manner as in Example 1, a positive electrode sheet was prepared, a battery was assembled, and various battery characteristics were measured. As a result, the initial weight capacity density of the positive electrode layer at from 2.5 to 4.3 V at 25° C. was 157 mAh/g, and the capacity retention after 30 times of charge and discharge cycle was 99.0%. Further, the first peak temperature (the heat generation peak temperature) of the heat generation curve of the 4.3 V charged product was 192° C.

Example 6

0.87 g of a commercially available magnesium carbonate powder was mixed with 1.41 g of aluminum lactate and 2.73 g of titanium lactate, then 2.60 g of a 50% glyoxylic acid aqueous solution and 191.6 g of water were added, and 0.57 g of ammonia was added to obtain an aqueous solution with pH 7.1 wherein glyoxylates of magnesium, aluminum and titanium were uniformly dissolved. The above aqueous solution was added to 224.24 g of the above cobalt hydroxide or the cobalt oxyhydroxide powder having a cobalt content of 60.0% to obtain a slurry. The solid content concentration in the slurry was 55 wt %.

This slurry was dehydrated in a dryer at 120° C. for 2 hours and then dry-mixed with 85.74 g of lithium carbonate having a specific surface area of 1.2 $m^2/g$. This mixture was fired in air at 950° C. for 12 hours to obtain $LiCo_{0.99}Al_{0.004}Mg_{0.004}Ti_{0.002}O_2$. The fired product was crushed, and the particle size distribution of a lithium-containing composite oxide powder formed by agglomeration of primary particles thus obtained was measured in a water solvent by using a laser scattering type particle is size distribution measuring apparatus, and as a result, the average particle size D50 was 13.1 μm, D10 was 6.8 μm and D90 was 18.5 μm, and the specific surface area obtained by means of BET method was of 0.30 $m^2/g$.

With respect to this lithium-containing composite oxide powder, an X-ray diffraction spectrum was obtained by using an X-ray diffraction apparatus (RINT 2100 model, manufactured by Rigaku Corporation). In the powder X-ray diffraction analysis using CuKα rays, the half value width of the diffraction peak of (110) plane at 2θ=66.5±1° was 0.115°. The press density of this powder was 3.70 $g/cm^3$. 10 g of this lithium-cobalt composite oxide powder was dispersed in 100 g of pure water, and after filtration, the amount of the remaining alkali was obtained by potentiometric titration with 0.1 N HCl and found to be 0.02 wt %.

Further, with respect to the above lithium-containing composite oxide powder, in the same manner as in Example 1, a positive electrode sheet was prepared, a battery was assembled, and various battery characteristics were measured. As a result, the initial weight capacity density of the positive electrode layer at from 2.5 to 4.3 V at 25° C. was 162 mAh/g, and the capacity retention after 30 times of charge and discharge cycle was 99.1%. Further, the first peak temperature (the heat generation peak temperature) of the heat generation curve of the 4.3 V charged product was 188° C.

Example 7

0.87 g of a commercially available magnesium carbonate powder was mixed with 1.41 g of aluminum lactate and 2.73 g of titanium lactate, then 2.60 g of a 50% glyoxylic acid aqueous solution and 191.6 g of water were added, and 0.57 g of ammonia was added to obtain an aqueous solution with pH 7.1 wherein glyoxylates of magnesium, aluminum and titanium were uniformly dissolved. The above aqueous solution was added to 185.32 g of the above cobalt hydroxide or the cobalt oxide powder having a cobalt content of 72.6% to obtain a slurry. The solid content concentration in the slurry was 50 wt %.

This slurry was dehydrated in a dryer at 120° C. for 2 hours, and then dry-mixed with 85.74 g of lithium carbonate having a specific surface area of 1.2 $m^2/g$. This mixture was fired in air at 950° C. for 12 hours to obtain $LiCo_{0.99}Al_{0.004}Mg_{0.004}Ti_{0.002}O_2$. The fired product was crushed, and the particle size distribution of a lithium-containing composite oxide powder formed by agglomeration of primary particles thus obtained was measured in a water solvent by using a laser scattering type particle size distribution measuring apparatus, and as a result, the average particle size D50 was 10.1 μm, D10 was 4.3 μm and D90 was 16.4 μm, and the specific surface area obtained by means of BET method was 0.33 $m^2/g$.

With respect to this lithium-containing composite oxide powder, an X-ray diffraction spectrum was obtained by using an X-ray diffraction apparatus (RINT 2100 model, manufactured by Rigaku Corporation). In the powder X-ray diffraction analysis using CuKα rays, the half value width of the diffraction peak of (110) plane at 2θ=66.5±1° was 0.120°. The press density of this powder was 3.60 $g/cm^3$. 10 g of this lithium-cobalt composite oxide powder was dispersed in 100 g of pure water, and after filtration, the amount of the remaining alkali was obtained by potentiometric titration with 0.1 N HCl and found to be 0.02 wt %.

Further, with respect to the above lithium-containing composite oxide powder, in the same manner as in Example 1, a positive electrode sheet was prepared, a battery was assembled, and various battery characteristics were measured. As a result, the initial weight capacity density of the positive electrode layer at from 2.5 to 4.3 V at 25° C. was 157 mAh/g, and the capacity retention after 30 times of charge and discharge cycle was 99.0%. Further, the first peak temperature (the heat generation peak temperature) of the heat generation curve of the 4.3 V charged product was 186° C.

Comparative Example 1

A powder of $LiCo_{0.99}Al_{0.004}Mg_{0.004}Ti_{0.002}O_2$ was obtained in the same manner as in Example 1 except that instead of dry-mixing and firing the dehydrated slurry and lithium carbonate, 0.73 g of an aluminum hydroxide powder, 0.54 g is of a magnesium hydroxide powder, 0.37 g of a titanium oxide powder, 215.34 g of cobalt hydroxide and 85.23 g of lithium carbonate were dry-mixed and fired. The average particle size D50 of this powder was 11.9 μm, D10 was 6.5 μm and D90 was 17.9 μm, and it was an agglomerate powder with a specific surface area of 0.45 m$^2$/g as obtained by means of BET method.

With respect to the above powder, an X-ray diffraction spectrum was obtained by using an X-ray diffraction apparatus (RINT 2100 model, manufactured by Rigaku Corporation). In the powder X-ray diffraction analysis using CuKα rays, the half value width of the diffraction peak of (110) plane in the vicinity of 2θ=66.5±1° was 0.140°. The press density of this powder was 3.80 g/cm$^3$.

Further, in the same manner as in Example 1, a positive electrode sheet was prepared by using the above powder, a battery was assembled and its characteristics were measured. As a result, the initial weight capacity density of the positive electrode layer was 158 mAh/g, and the capacity retention after 30 cycles was 96.9%, and the heat generation peak temperature was 182° C.

Comparative Example 2

$LiCo_{0.99}Al_{0.004}Mg_{0.004}Ti_{0.002}O_2$ was prepared in the same manner as in Example 6 except that instead of dry-mixing and firing the dehydrated slurry and lithium carbonate in Example 6, 0.73 g of an aluminum hydroxide powder, 0.54 g of a magnesium hydroxide powder, 0.37 g of a titanium oxide powder, 224.23 g of cobalt oxyhydroxide and 85.74 g of lithium carbonate were dry-mixed and fired.

The average particle size D50 of the prepared product was 13.3 μm, D10 was 6.5 μm and D90 was 18.9 μm, and the specific surface area was 0.32 m$^2$/g as obtained by BET method. With respect to the powder, an X-ray diffraction spectrum was obtained by using an X-ray diffraction apparatus (RINT 2100 model, manufactured by Rigaku Corporation). In the powder X-ray diffraction analysis using CuKα rays, the half value width of the diffraction peak of (110) plane in the vicinity of 2θ=66.5±1° was 0.125°. The press density of this powder was 3.67 g/cm$^3$.

Further, in the same manner as in Example 1, a positive electrode sheet was prepared, a battery was assembled, and its characteristics were measured. The initial weight capacity density of the positive electrode layer was 158 mAh/g, and the capacity retention after 30 cycles was 96.0%, and the heat generation peak temperature was 182° C.

Comparative Example 3

$LiCo_{0.99}Al_{0.004}Mg_{0.004}Ti_{0.002}O_2$ was prepared in the same manner as in Example 7 except that instead of dry-mixing and firing the dehydrated slurry and lithium carbonate in Example 7, 0.73 g of an aluminum hydroxide powder, 0.54 g of a magnesium hydroxide powder, 0.37 g of a titanium oxide powder, 185.32 g of cobalt oxide and 85.74 g of lithium carbonate were dry-mixed and fired.

The average particle size D50 of the prepared product was 9.9 μm, D10 was 4.5 μm and D90 was 16.9 μm, and the specific surface area was 0.35 m$^2$/g as obtained by BET method. With respect to the powder, an X-ray diffraction spectrum was obtained by using an X-ray diffraction apparatus (RINT 2100 model, manufactured by Rigaku Corporation). In the powder X-ray diffraction analysis using CuKα rays, the half value width of the diffraction peak of (110) plane in the vicinity of 2θ=66.5±1° was 0.123°. The press density of this powder was 3.55 g/cm$^3$.

Further, in the same manner as in Example 1, a positive electrode sheet was prepared, a battery was assembled, and its characteristics were measured. The initial weight capacity density of the positive electrode layer was 155 mAh/g, and the capacity retention after 30 cycles was 95.5%, and the heat generation peak temperature was 180° C.

INDUSTRIAL APPLICABILITY

The lithium-containing composite oxide obtainable by the present invention is useful for application to a positive electrode for a lithium secondary battery and to a lithium secondary battery.

The entire disclosure of Japanese Patent Application No. 2005-280674 filed on Sep. 27, 2005 including specification, claims, drawings and summary is incorporated herein by reference in its entirety.

What is claimed is:

1. A process for producing a lithium-containing composite oxide represented by:

wherein
N is at least one element selected from the group consisting of Co, Mn and Ni,
M is at least one element selected from the group consisting of Al, alkaline earth metal elements and transition metal elements other than N,
$0.9 \leq p \leq 1.2$,
$0.97 \leq x < 1.00$,
$0 < m \leq 0.03$,
$1.9 \leq z \leq 2.2$,
$x+m=1$ and
$0 \leq a \leq 0.02$, which process comprises
firing a mixture comprising a lithium source, an N element source, and an M element source, and optionally a fluorine source, in an atmosphere comprising oxygen,
wherein said M element source is an aqueous solution of a ketocarboxylate compound having the M element, at least is one carboxyl group, and at least one carbonyl group present within the ketocarboxylate molecule.

2. The process according to claim 1, wherein the N element source is a powder having an average particle size, D50, of from 1 to 25 μm.

3. The process according to claim 1, wherein the ketocarboxylate is one having from 2 to 8 carbon atoms.

4. The process according to claim 1, further comprising adjusting a pH of the aqueous solution of a ketocarboxylate compound to a value of from 2 to 12 by adding an alkali.

5. The process according to claim 4, wherein the pH of the aqueous solution of a ketocarboxylate compound is from 4 to 10.

6. The process according to claim 5, wherein said pH is obtained by adding ammonia as said alkali to said aqueous solution of a ketocarboxylate compound.

7. The process according to claim 1, wherein the N element source is at least one member selected from the group consisting of cobalt hydroxide, cobalt oxyhydroxide, tricobalt tetroxide and cobalt carbonate.

8. The process according to claim 1, wherein the N element source is at least one member selected from the group consisting of nickel-cobalt coprecipitated hydroxide, nickel-cobalt coprecipitated oxyhydroxide, nickel-cobalt coprecipitated oxide, nickel-manganese coprecipitated hydroxide, nickel-manganese coprecipitated oxyhydroxide, nickel-manganese coprecipitated oxide, nickel-cobalt-manganese coprecipitated hydroxide, nickel-cobalt-manganese coprecipitated oxyhydroxide and nickel-cobalt-manganese coprecipitated oxide.

9. The process according to claim 1, wherein the M element is at least one member selected from the group consisting of Ti, Zr, Hf, Nb, Ta, Mg, Sn, Zn, Cu and Al.

10. The process according to claim 1,
further comprising mixing said aqueous solution of a ketocarboxylate compound, a powder of the N element source, and if necessary, a powder of the fluorine source to obtain a mixture;
removing the water from said mixture; and then,
mixing a powder of the lithium source and optionally a powder of the fluorine source with said mixture; wherein said firing is carried out at a temperature of from 800 to 1,050° C.

11. The process according to claim 1,
further comprising mixing said aqueous solution of a ketocarboxylate compound, a powder of the N element source, a powder of the lithium source and optionally a powder of the fluorine source to obtain a mixture, and;
removing the water from said mixture; wherein said firing is carried out at a temperature of from 800 to 1,050° C.

12. The process according to claim 1, further comprising mixing a lithium-containing composite oxide powder obtained by said firing with an aqueous solution of a ketocarboxylate compound to obtain a mixture;
removing the water from said mixing; and then
firing said mixture at a temperature of from 300 to 1,050° C. in an atmosphere comprising oxygen.

13. The process according to claim 1, further comprising mixing at least an N element source and an M element source so that the N element: the M element atomic ratio is from 0.95:0.05 to 0.9995:0.0005.

14. The process according to claim 13, wherein the N element source is at least one member selected from the group consisting of a hydroxide, an oxyhydroxide, an oxide and a carbonate.

15. The process according to claim 10, wherein said removing is carried out at a temperature of from 50 to 200° C. for a period of from 1 to 10 hours.

16. The process according to claim 1, wherein said lithium source is selected from the group consisting of lithium carbonate and lithium hydroxide.

17. The process according to claim 1, wherein said mixture comprises a fluorine source selected from the group consisting of LiF and $MgF_2$.

18. The process according to claim 1, wherein said firing is carried out at a temperature of from 800 to 1,050° C.

* * * * *